(12) United States Patent
Wang et al.

(10) Patent No.: US 10,419,706 B2
(45) Date of Patent: Sep. 17, 2019

(54) METHOD AND DEVICE FOR QUICKLY STARTING A TELEVISION FUNCTION

(71) Applicant: SHENZHEN SKYWORTH-RGB ELECTRONIC CO., LTD., Shenzhen, Guangdong (CN)

(72) Inventors: Huibo Wang, Guangdong (CN); Bangyu Sun, Guangdong (CN); Xiao Wang, Guangdong (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 15/765,953

(22) PCT Filed: Dec. 19, 2017

(86) PCT No.: PCT/CN2017/117248
§ 371 (c)(1),
(2) Date: Apr. 4, 2018

(87) PCT Pub. No.: WO2018/126888
PCT Pub. Date: Jul. 12, 2018

(65) Prior Publication Data
US 2019/0116333 A1    Apr. 18, 2019

(30) Foreign Application Priority Data
Jan. 6, 2017   (CN) .......................... 2017 1 0012196

(51) Int. Cl.
*H04N 5/44* (2011.01)
*H04N 21/443* (2011.01)
(Continued)

(52) U.S. Cl.
CPC ........... *H04N 5/4403* (2013.01); *G06F 3/048* (2013.01); *H04N 21/4221* (2013.01);
(Continued)

(58) Field of Classification Search
CPC ............. H04N 5/4403; H04N 21/4221; H04N 21/4438; H04N 2005/4412
See application file for complete search history.

(56) References Cited

U.S. PATENT DOCUMENTS

| | | | |
|---|---|---|---|
| 2010/0050128 A1* | 2/2010 | Chiang | ................... G06F 9/451 715/847 |
| 2010/0205559 A1 | 8/2010 | Rose | |
| 2010/0229093 A1* | 9/2010 | Matsubayashi | .... H04N 5/44543 715/716 |

FOREIGN PATENT DOCUMENTS

| CN | 104657031 | 5/2015 |
|---|---|---|
| CN | 105430468 | 3/2016 |

(Continued)

OTHER PUBLICATIONS

International search report dated Feb. 26, 2018 from corresponding application No. PCT/CN2017/117248.

*Primary Examiner* — Michael E Teitelbaum
(74) *Attorney, Agent, or Firm* — Hauptman Ham, LLP (57) ABSTRACT

A method for quickly starting a television function is disclosed and includes: in response to receiving a start instruction triggered based on a start icon in a currently displayed startup page, starting a television function corresponding to the start instruction; updating the number of times of starts of the start icon corresponding to the start instruction; and when the updated number of times of starts is greater than a preset number of times, adding the start icon corresponding to the start instruction to a quick start interface corresponding to a quick start key of a remote controller. A device for quickly starting a television function is further disclosed. Thus, when the user has started a certain television function multiple times through the start icon in the startup page, the corresponding start icon will be added to the quick start interface corresponding to the quick start key.

10 Claims, 5 Drawing Sheets

(51) Int. Cl.
*H04N 21/422* (2011.01)
*H04N 21/442* (2011.01)
*G06F 3/048* (2013.01)

(52) U.S. Cl.
CPC ... *H04N 21/42227* (2013.01); *H04N 21/4438* (2013.01); *H04N 21/44222* (2013.01); *H04N 2005/4412* (2013.01); *H04N 2005/4439* (2013.01)

(56) References Cited

FOREIGN PATENT DOCUMENTS

| CN | 105872682 | 8/2016 |
|----|-----------|--------|
| CN | 106792199 | 5/2017 |

\* cited by examiner

METHOD AND DEVICE FOR QUICKLY STARTING A TELEVISION FUNCTION

RELATED APPLICATIONS

The present application is a National Phase of International Application Number PCT/CN2017/117248, filed Dec. 19, 2017, and claims the priority of China Application No. 201710012196.X, filed Jan. 6, 2017.

TECHNICAL FIELD

This disclosure relates generally to the technical field of televisions, and more particularly relates to a method and a device for quickly starting a television function.

BACKGROUND

With the rapid development of smart television technology, televisions today have increasingly rich functions. In order to meet users' different requirements on televisions, television manufacturers have created various complicated functions such as personal video recorder (PVR), Video, Photos, Music, HDMI, Parental Control, and so forth. The HOME page of the television system thus hosts a large number of television function icons, and many of these functions may have multiple micro functions in their sub-pages. For example, there are numerous functions in the Menu that are as many as those in the HOME page.

Due to the increasing number of television functions, the user, when needing to use a certain function, needs to search among numerous functions to find the required function, resulting in cumbersome operations for the user. For example, each time the user needs to search for channels, he would always need to first go to the HOME page and then enter the Menu page to perform the channel search operation.

SUMMARY

This disclosure provides a method and a device for quickly starting a television function, which aims to solve the technical problem that the user needs to perform cumbersome operations to find the required function from among numerous functions.

In order to achieve the above object, this disclosure provides a method for quickly starting a television function. The method may include the following operations. After receiving a start instruction triggered based on a start icon in a currently displayed startup page which contains the corresponding start icons of multiple television functions, the television function corresponding to the start instruction is started. Then the number of times of starts of the start icon corresponding to the start instruction is updated. When the updated number of times of starts is greater than a preset number of times, the start icon corresponding to the start instruction is added to a quick start interface corresponding to a quick start key of a remote controller.

In some embodiments, adding the start icon corresponding to the start instruction to the quick start interface corresponding to the quick start key of the remote controller when the updated number of times of starts is greater than the preset number of times includes the following operations: determining whether the television function corresponding to the start instruction exists in the quick start interface when the updated number of times of starts is greater than the preset number of times; and adding the start icon corresponding to the start instruction to the quick start interface when the start icon corresponding to the start instruction doesn't exist in the quick start interface.

In some embodiments, the method for quickly starting a television function further includes the following operations: upon receiving an add instruction triggered based on a start icon in the currently displayed startup page, determining whether the start icon corresponding to the add instruction exists in the quick start interface; and adding the start icon corresponding to the add instruction to the quick start interface when the start icon corresponding to the add instruction doesn't exist in the quick start interface.

In some embodiments, the method for quickly starting a television function further includes the following operations, subsequent to adding the start icon corresponding to the start instruction to the quick start interface corresponding to the quick start key of the remote controller: upon receiving a display instruction triggered based on the quick start key of the remote controller, displaying the quick start interface in a display interface of the television; and upon receiving a start instruction triggered based on a start icon in the quick start interface, starting the television function corresponding to the start instruction.

In some embodiments, the method for quickly starting a television function further includes the following operations, subsequent to displaying the quick start interface in the display interface of the television: upon receiving a deleting instruction triggered based on a start icon in the quick start interface, deleting the start icon corresponding to the deleting instruction from the quick start interface; and updating the corresponding number of times of starts of the deleted start icon.

In order to achieve the above object, this disclosure further provides a device for quickly starting a television function, the device including: a first starting module configured to, in response to receiving a start instruction triggered based on a start icon in a currently displayed startup page which contains the corresponding start icons of multiple television functions, start the television function corresponding to the start instruction; a first updating module configured to update the number of times of starts of the start icon corresponding to the start instruction; and a first adding module configured to add the start icon corresponding to the start instruction to a quick start interface corresponding to a quick start key of a remote controller when the updated number of times of starts is greater than a preset number of times.

In some embodiments, the first adding module includes: a determining unit configured to determine whether the television function corresponding to the start instruction exists in the quick start interface when the updated number of times of starts is greater than the preset number of times; and an adding unit configured to add the start icon corresponding to the start instruction to the quick start interface when the start icon corresponding to the start instruction doesn't exist in the quick start interface.

In some embodiments, the device for quickly starting a television function further includes: a determining module configured to, in response to receiving an add instruction triggered based on a start icon in a currently displayed startup page, determine whether the start icon corresponding to the add instruction exists in the quick start interface; and a second adding module configured to add the start icon corresponding to the add instruction to the quick start interface when the start icon corresponding to the add instruction doesn't exist in the quick start interface.

In some embodiments, the device for quickly starting a television function further includes: a display module configured to, in response to receiving a display instruction triggered based on the quick start key of the remote controller, display the quick start interface in a display interface of the television; and a second starting module configured to, in response to receiving a start instruction triggered based on a start icon in the quick start interface, start the television function corresponding to the start instruction.

In some embodiments, the device for quickly starting a television function further includes: a deleting module configured to, in response to receiving a deleting instruction triggered based on a start icon in the quick start interface, delete the start icon corresponding to the deleting instruction from the quick start interface; and a second updating module configured to update the corresponding number of times of starts of the deleted start icon.

According to this disclosure, after receiving a start instruction triggered based on a start icon in a currently displayed startup page, the television function corresponding to the start instruction is started, and the number of times of starts of the start icon corresponding to the start instruction is updated. Then when the updated number of times of starts is greater than a preset number of times, the start icon corresponding to the start instruction would be added to a quick start interface corresponding to a quick start key of a remote controller. Thus, when the user has started a certain television function multiple times through the start icon in the startup page, the corresponding start icon will be added to the quick start interface corresponding to the quick start key. As such, the television functions repeatedly used by the user can be automatically added to the quick start interface, which reduces the user's operations when using the corresponding television functions, thus improving the user experience.

Various implementations, functional features, and advantages of this disclosure will now be described in further detail in connection with some illustrative embodiments and the accompanying drawings.

DETAILED DESCRIPTION OF ILLUSTRATIVE EMBODIMENTS

It will be appreciated that the specific embodiments described herein are merely illustrative of the disclosure and are not intended to limit the disclosure.

Figure 1:
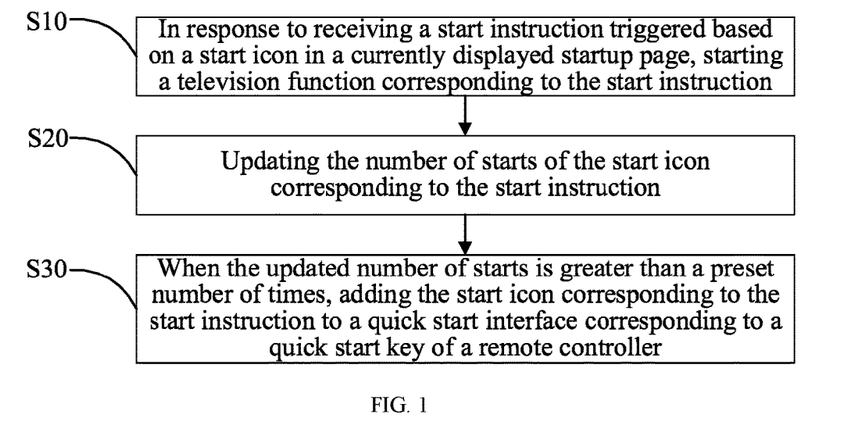
FIG. 1 is an illustrative flowchart of a first embodiment of a method for quickly starting a television function according to this disclosure.

There is provided a method for quickly starting a television function. FIG. 1 is an illustrative flowchart of a first embodiment of a method for quickly starting a television function according to this disclosure.

In this embodiment, the method for quickly starting a television function includes the following blocks which begin at S10.

In S10, after receiving a start instruction that is triggered based on a start icon in a currently displayed startup page, the television function corresponding to the start instruction is started, where the startup page contains the corresponding start icons of multiple television functions.

In this embodiment, the user can enter the startup page through keys of a remote controller or the television, where the startup page contains the corresponding start icons of all the television functions of the television. The sub-functions of the corresponding television functions can also be triggered through the above-described start icons. After receiving a start instruction which is triggered based on a start icon in the currently displayed startup page, the television function corresponding to the start instruction will be started to satisfy the user's need. The method then proceeds to S20.

In S20, the number of times of starts of the start icon corresponding to the start instruction is updated.

In this embodiment, each time the corresponding television function is started by using the start icon, the number of times of starts of this start icon will be accumulated. That is, when the start instruction triggered based on the start icon is received, the number of times of starts of the start icon corresponding to the start instruction will be updated in order to record the current number of times that the user has activated the corresponding television function through this start icon; specifically, the number of times of starts is incremented by 1 as the new number of times of starts.

In one embodiment, an array, i.e., a preset array, in which the number of array elements is the same as the number of television functions, may be set. Accordingly, when receiving a start instruction triggered based on the start icon, the value of the array element in the preset array that corresponds to this start instruction will be updated. The method then continues to S30.

In S30, when the updated number of times of starts is greater than a preset number of times, the start icon corresponding to the start instruction is added to a quick start interface corresponding to a quick start key of a remote controller.

In this embodiment, the remote controller is provided with a quick start key. Specifically, a quick start key such as an F key can be added to the remote controller. The user can add the corresponding start icons of the television functions to the quick start interface corresponding to the F key. Thus, selecting a start icon in the quick start interface corresponding to the F key, the user can directly jump to the selected function. Alternatively, in the quick start interface corresponding to the F key, numeric keys from 0 to 9 can also be used to quickly select the desired function.

In this embodiment, when the updated number of times of starts is greater than the preset number of times, the start icon corresponding to the start instruction will be added to the quick start interface corresponding to the quick start key of the remote controller, so that after the user has started a certain television function multiple times through a start icon in the startup page, the corresponding start icon will be added to the quick start interface corresponding to the quick start key.

In one embodiment, while adding the start icon corresponding to the start instruction to the quick start interface, the status of the number of times of starts is changed; for example, the status of the number of times of starts may be set to a non-editable status, so that when the user subsequently starts the corresponding television function again through the start icon of the startup page, the number of times of starts will no longer be accumulated. Further, while deleting a start icon from the quick start interface, the user can set the status of the number of times of starts to an editable state and set the number of times of starts to its initial value, e.g., 0, so that when the user subsequently starts the corresponding television function again through the start icon of the startup page, the number of times of starts will be re-accumulated.

According to the method for quickly starting a television function provided by this embodiment, after receiving a start instruction triggered based on a start icon in a currently displayed startup page, the television function corresponding to the start instruction is started, and the number of times of starts of the start icon corresponding to the start instruction is updated. Then when the updated number of times of starts is greater than a preset number of times, the start icon corresponding to the start instruction is added to a quick start interface corresponding to a quick start key of a remote controller. Thus, when the user has started a certain television function multiple times through the start icon in the startup page, the corresponding start icon will be added to the quick start interface corresponding to the quick start key. As such, the television functions repeatedly used by the user can be automatically added to the quick start interface, which reduces the user's operations when using the corresponding television functions and thus improves the user experience.

Figure 2:
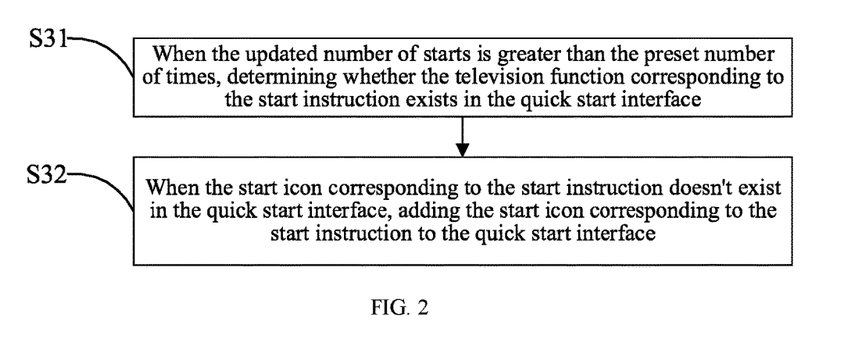
FIG. 2 is a detailed flowchart illustrating the addition of a start icon corresponding to a start instruction to a quick start interface corresponding to a quick start key of a remote controller in a second embodiment of the method for quickly starting a television function according to this disclosure.

There is provided a second embodiment of the method for quickly starting a television function on the basis of the first embodiment. As illustrated in FIG. 2, block S30 may include the following operations S31 and S32.

In S31, when the updated number of times of starts is greater than the preset number of times, a determination is performed to make sure whether the television function corresponding to the start instruction exists in the quick start interface.

In this embodiment, for the convenience of the user, the start icons of some television functions may be automatically added to the quick start interface when the television is shipped. In order to avoid adding a start icon that already exists in the quick start interface again to this quick start interface when the number of times of starts is greater than the preset number of times thus resulting in two identical start icons appearing in the startup page, a determination is performed to make sure whether the television function corresponding to the start instruction exists in the quick start interface when the number of times of starts is greater than the preset number of times.

In S32, when the start icon corresponding to the start instruction doesn't exist in the quick start interface, the start icon corresponding to the start instruction is added to the quick start interface.

In this embodiment, when the start icon corresponding to the start instruction doesn't exist in the quick start interface, the start icon corresponding to the start instruction is added to the quick start interface. Otherwise when the start icon corresponding to the start instruction exists in the quick start interface, then the start icon will not be added to the quick start interface, so as to avoid two identical start icons present in the quick start interface, which may otherwise result in a waste of system resources.

According to the method for quickly starting a television function provided by this embodiment, when the updated number of times of starts is greater than the preset number of times, a determination is performed to make sure whether the television function corresponding to the start instruction exists in the quick start interface, and then if the start icon corresponding to the start instruction doesn't exist in the quick start interface, the start icon corresponding to the start instruction will be added to the quick start interface, so that when the number of times of starts is greater than the preset number of times the start icon which doesn't exist in the quick start interface can be added to the quick start interface, which can avoid two identical start icons present in the quick start interface and thus can avoid the waste of system resources.

Figure 3:
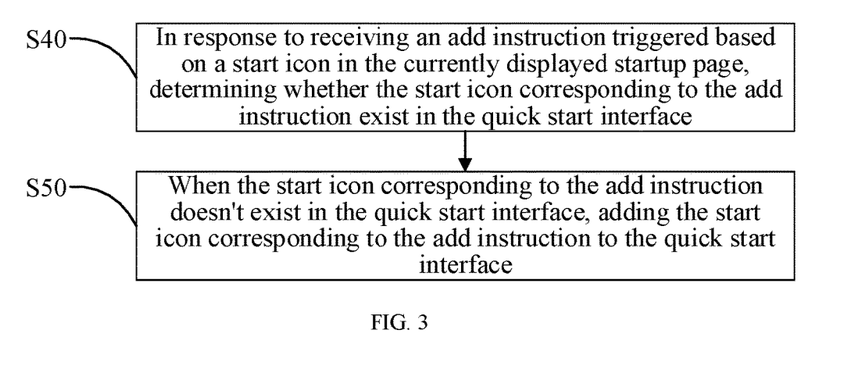
FIG. 3 is an illustrative flowchart of a third embodiment of the method for quickly starting a television function according to this disclosure.

There is provided a third embodiment of the method for quickly starting a television function on the basis of the first embodiment. As illustrated in FIG. 3, the method may further include the following blocks S40 and S50.

In S40, in response to receiving an add instruction triggered based on a start icon in the currently displayed startup page, a determination is performed to make sure whether the start icon corresponding to the add instruction exists in the quick start interface.

In this embodiment, the user can actively add the start icons of some television functions to the quick start interface. Of course, in order to avoid adding the start icon that already exists in the quick start interface to the quick start interface when the number of times of starts is greater than the preset number of times thus resulting in two identical start icons appearing in the quick start interface, a determination is performed to make sure whether the television function corresponding to the add instruction exists in the quick start interface upon receiving the add instruction which is triggered based on a start icon in the currently displayed startup page.

In S50, when the start icon corresponding to the add instruction doesn't exist in the quick start interface, the start icon corresponding to the add instruction is added to the quick start interface.

In this embodiment, when the start icon corresponding to the add instruction doesn't exist in the quick start interface, the start icon corresponding to the add instruction will be added to the quick start interface. Otherwise when the start icon corresponding to the add instruction exists in the quick start interface, then the start icon will not be added to the quick start interface, so as to avoid two identical start icons present in the quick start interface, which may otherwise result in a waste of system resources.

According to the method for quickly starting a television function provided by this embodiment, after receiving an add instruction which is triggered based on a start icon in the currently displayed startup page, a determination is performed to make sure whether the start icon corresponding to the add instruction exists in the quick start interface, and then if the start icon corresponding to the add instruction doesn't exist in the quick start interface, the start icon corresponding to the add instruction will be added to the quick start interface. Thus, the user can actively add the start icons of some television functions to the quick start interface, which improves the user experience and meanwhile avoids two identical start icons present in the quick start interface, thereby avoiding the waste of system resources.

Figure 4:
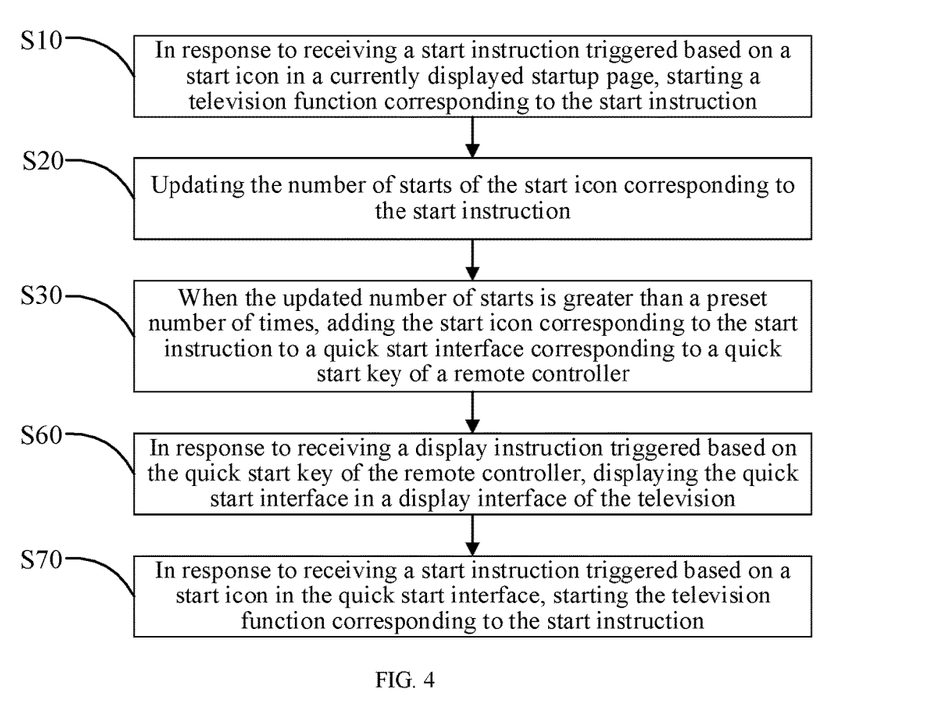
FIG. 4 is an illustrative flowchart of a fourth embodiment of the method for quickly starting a television function according to this disclosure.

There is provided a fourth embodiment of the method for quickly starting a television function on the basis of the first embodiment. As illustrated in FIG. 4, the method may further include the following blocks S60 and S70 subsequent to block S30.

In S60, in response to receiving a display instruction triggered based on the quick start key of the remote controller, the quick start interface is displayed in a display interface of the television.

In this embodiment, the user can trigger a display instruction for the quick start interface through the quick start key of the remote controller; that is, after receiving the display instruction triggered based on the quick start key of the remote controller, the quick start interface will be displayed in the television's display interface, where the quick start interface contains the start icons of all the television functions that have currently been added.

In S70, in response to receiving a start instruction triggered based on a start icon of the quick start interface, the television function corresponding to the start instruction is started.

In this embodiment, the user can trigger a start instruction through, e.g., the remote controller. For example, the user can select a start icon in the quick start interface by using the remote controller. After receiving a start instruction triggered based on the start icon in the quick start interface, the television function corresponding to the start instruction can then be started. Thus, the user can start the corresponding television functions through the quick start interface, thereby reducing the operations performed by the user when using the corresponding television functions.

According to the method for quickly starting a television function provided by this embodiment, after receiving a display instruction triggered based on the quick start key of the remote controller, the quick start interface is displayed in the television's display interface. Then after receiving a start instruction triggered based on a start icon in the quick start interface, the television function corresponding to the start instruction is started. Thus, the corresponding television functions can be started through the quick start interface, reducing the operations performed by the user when using the corresponding television functions, resulting in further improved user experience.

Figure 5:
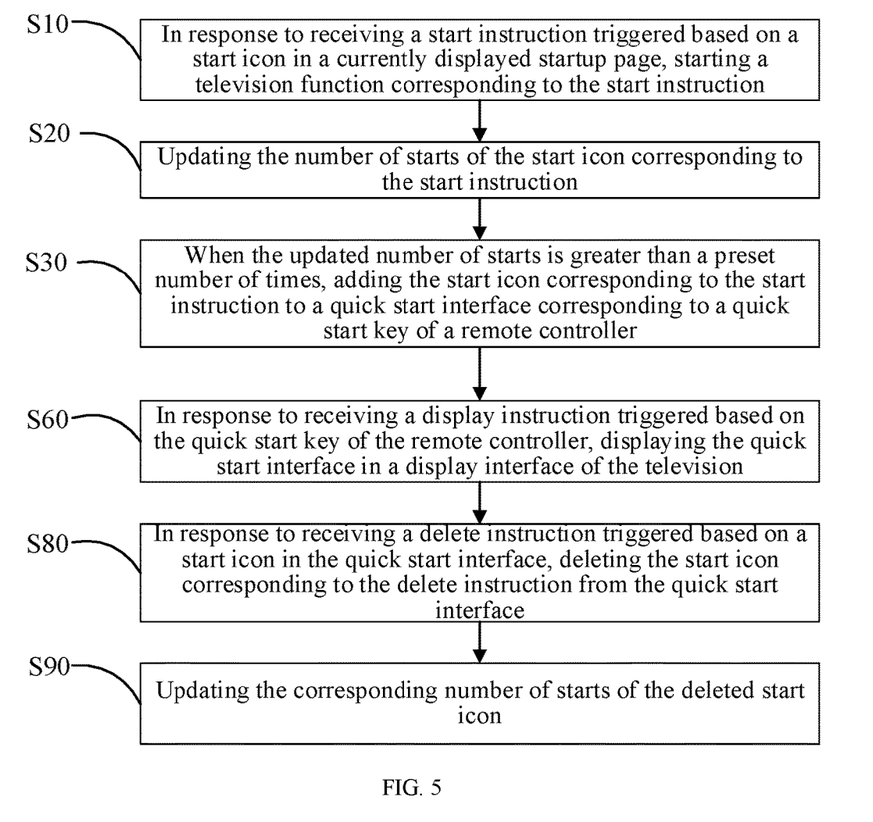
FIG. 5 is an illustrative flowchart of a fifth embodiment of the method for quickly starting a television function according to this disclosure.

There is provided a fifth embodiment of the method for quickly starting a television function on the basis of the first embodiment. As illustrated in FIG. 5, the method may further include the following blocks S80 and S90 subsequent to block S60.

In S80, after receiving a deleting instruction triggered based on a start icon in the quick start interface, the start icon corresponding to the deleting instruction is deleted from the quick start interface.

In this embodiment, the user can actively delete the start icons of some television functions present in the quick start interface. The deleting instruction for the start icon may be triggered by a remote controller or the like. For example, the remote controller can be used to select a corresponding delete option of the start icon in the quick start interface in order to trigger the deleting instruction for the start icon. Specifically, upon receiving the deleting instruction which is triggered based on the start icon in the quick start interface, the start icon corresponding to this deleting instruction will be deleted from the quick start interface.

In S90, the corresponding number of times of starts of the deleted start icon is updated.

In this embodiment, to facilitate the user to re-add the deleted start icon to the quick start interface after subsequently using this start icon multiple times, the corresponding number of times of starts of the deleted start icon is updated. Specifically, the number of times of starts may be set to its initial value such as 0; in addition, if the status of the number of times of starts is non-editable, then the status of the number of times of starts can be modified to an editable status.

According to the method for quickly starting a television function provided by this embodiment, after receiving a deleting instruction triggered based on a start icon in the quick start interface, the start icon corresponding to the deleting instruction is deleted from the quick start interface, and then the corresponding number of times of starts of the deleted start icon is updated. Thus, the user can delete the start icons in the quick start interface as needed in order to avoid the start icons of the infrequently used television functions residing in the quick start interface for a long time, thereby saving system resources. Meanwhile, updating the number of times of starts can facilitate the user to re-add the deleted start icon to the quick start interface after subsequently repeatedly using the deleted start icon, thereby further improving the user experience.

Figure 6:
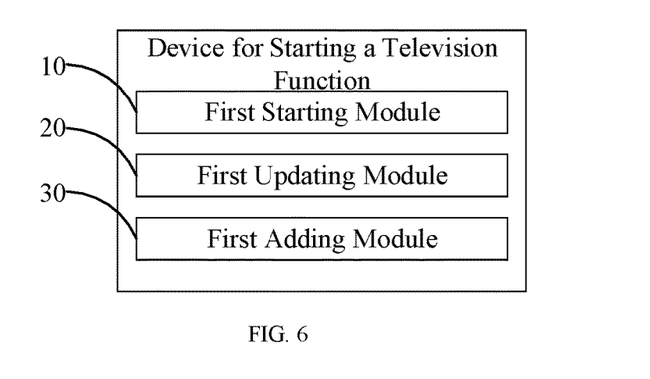
FIG. 6 is an illustrative functional block diagram of a first embodiment of a device for quickly starting a television function according to this disclosure.

This disclosure further provides a device for quickly starting a television function. FIG. 6 is an illustrative functional block diagram of a first embodiment of a device for quickly starting a television function according to this disclosure.

In this embodiment, the device for quickly starting a television function includes a first starting module 10, a first updating module 20, and a first adding module 30.

The first starting module 10 is configured to, in response to receiving a start instruction triggered based on a start icon in a currently displayed startup page, start a television function corresponding to the start instruction, where the startup page contains the corresponding start icons of multiple television functions.

In this embodiment, the user can enter the startup page through keys of a remote controller or the television, where the startup page contains the corresponding start icons of all the television functions of the television. The sub-functions of the corresponding television functions can also be triggered through the above-described start icons. After receiving a start instruction which is triggered based on a start icon in the currently displayed startup page, the television function corresponding to the start instruction is started to satisfy the user's need.

The first updating module 20 is configured to update the number of times of starts of the start icon corresponding to the start instruction.

In this embodiment, each time the corresponding television function is started by using the start icon, the number of times of starts of this start icon will be accumulated. That is, when the start instruction triggered based on the start icon is received, the number of times of starts of the start icon corresponding to the start instruction will be updated in order to record the current number of times that the user has activated the corresponding television function through this start icon; specifically, the number of times of starts is incremented by 1 as the new number of times of starts.

In one embodiment, an array, i.e., a preset array, in which the number of array elements is the same as the number of television functions, may be set. Accordingly, when receiving a start instruction triggered based on the start icon, the value of the array element in the preset array that corresponds to this start instruction will be updated.

The first adding module 30 is configured to add the start icon corresponding to the start instruction to a quick start interface corresponding to a quick start key of a remote controller when the updated number of times of starts is greater than a preset number of times.

In this embodiment, the remote controller is provided with a quick start key. Specifically, a quick start key such as an F key can be added to the remote controller. The user can add the corresponding start icons of the television functions to the quick start interface corresponding to the F key. Thus, selecting a start icon in the quick start interface corresponding to the F key, the user can directly jump to the selected function. Alternatively, in the quick start interface corresponding to the F key, numeric keys from 0 to 9 can also be used to quickly select the desired function.

In this embodiment, when the updated number of times of starts is greater than the preset number of times, the start icon corresponding to the start instruction will be added to the quick start interface corresponding to the quick start key of the remote controller, so that after the user has started a certain television function multiple times through a start icon in the startup page, the corresponding start icon will be added to the quick start interface corresponding to the quick start key.

In one embodiment, while adding the start icon corresponding to the start instruction to the quick start interface, the status of the number of times of starts is changed; for example, the status of the number of times of starts may be set to a non-editable status, so that when the user subsequently starts the corresponding television function again through the start icon of the startup page, the number of times of starts will no longer be accumulated. Further, while deleting a start icon in the quick start interface, the user can set the status of the number of times of starts to an editable state and set the number of times of starts to its initial value, e.g., 0, such that when the user subsequently starts the corresponding television function again through the start icon of the startup page, the number of times of starts will be re-accumulated.

According to the device for quickly starting a television function provided by this embodiment, after receiving a start instruction triggered based on a start icon in a currently displayed startup page, the first adding module 10 starts the television function corresponding to the start instruction, and then the first updating module 20 updates the number of times of starts of the start icon corresponding to the start instruction. Then when the updated number of times of starts is greater than a preset number of times, the first adding module 30 will add the start icon corresponding to the start instruction to a quick start interface corresponding to a quick start key of a remote controller. Thus, when the user has started a certain television function multiple times through the start icon in the startup page, the corresponding start icon will be added to the quick start interface corresponding to the quick start key. As such, the television functions repeatedly used by the user can be automatically added to the quick start interface, which reduces the user's operations when using the corresponding television functions, thus improving the user experience.

Figure 7:
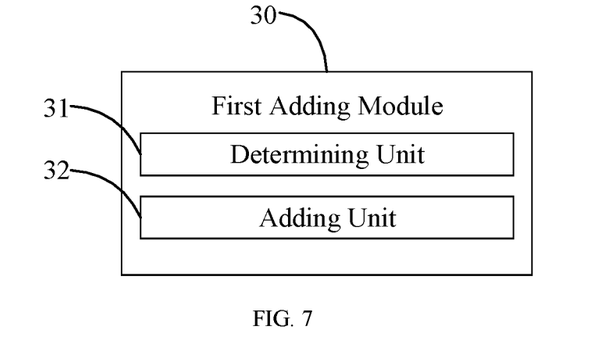
FIG. 7 is a detailed functional block diagram of a first adding module in a second embodiment of the device for quickly starting a television function according to this disclosure.

There is provided a second embodiment of the device for quickly starting a television function on the basis of the first embodiment. As illustrated in FIG. 7, the first adding module 30 includes a determining unit 31 and an adding unit 32.

The determining unit 31 is configured to determine whether the television function corresponding to the start instruction exists in the quick start interface when the updated number of times of starts is greater than the preset number of times.

In this embodiment, for the convenience of the user, the start icons of some television functions may be automatically added to the quick start interface when the television is shipped. In order to avoid adding a start icon that already exists in the quick start interface again to this quick start interface when the number of times of starts is greater than the preset number of times thus resulting in two identical start icons appearing in the startup page, a determination is performed to make sure whether the television function corresponding to the start instruction exists in the quick start interface when the number of times of starts is greater than the preset number of times.

The adding unit 32 is configured to add the start icon corresponding to the start instruction to the quick start interface when the start icon corresponding to the start instruction doesn't exist in the quick start interface.

In this embodiment, when the start icon corresponding to the start instruction doesn't exist in the quick start interface, the start icon corresponding to the start instruction will be added to the quick start interface. Otherwise when the start icon corresponding to the start instruction exists in the quick start interface, then the start icon will not be added to the quick start interface, so as to avoid two identical start icons present in the quick start interface, which may otherwise lead to a waste of system resources.

According to the device for quickly starting a television function provided by this embodiment, when the updated number of times of starts is greater than the preset number of times, the determining unit 31 determines whether the television function corresponding to the start instruction exists in the quick start interface, and then if the start icon corresponding to the start instruction doesn't exist in the quick start interface, the adding unit 32 will add the start icon corresponding to the start instruction to the quick start interface, so that when the number of times of starts is greater than the preset number of times the start icon which doesn't exist in the quick start interface can be added to the quick start interface, which can avoid two identical start icons present in the quick start interface and thus can avoid the waste of system resources.

Figure 8:
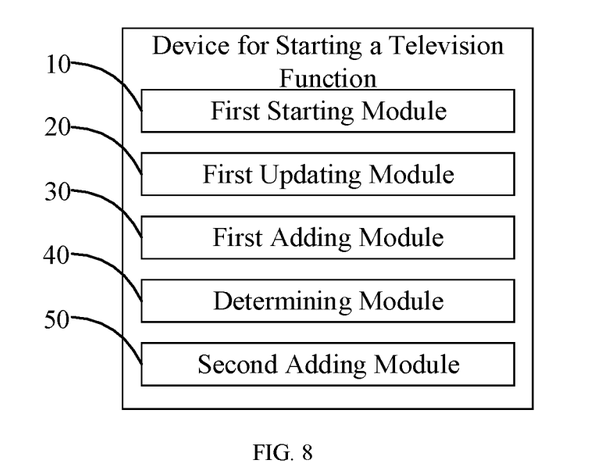
FIG. 8 is an illustrative functional block diagram of a third embodiment of the device for quickly starting a television function according to this disclosure.

There is provided a third embodiment of the device for quickly starting a television function on the basis of the first embodiment. As illustrated in FIG. 8, the device may further include a determining module 40 and a second adding module 50.

The determining module 40 is configured to, in response to receiving an add instruction triggered based on a start icon in the currently displayed startup page, determine whether the start icon corresponding to the add instruction exists in the quick start interface.

In this embodiment, the user can actively add the start icons of some television functions to the quick start interface. Of course, in order to avoid adding the start icon that already exists in the quick start interface to the quick start interface when the number of times of starts is greater than the preset number of times thus resulting in two identical start icons appearing in the quick start interface, a determination is performed to make sure whether the television function corresponding to the add instruction exists in the quick start interface upon receiving the add instruction which is triggered based on a start icon in the currently displayed startup page.

The second adding module 50 is configured to add the start icon corresponding to the add instruction to the quick start interface when the start icon corresponding to the start instruction doesn't exist in the quick start interface.

In this embodiment, when the start icon corresponding to the add instruction doesn't exist in the quick start interface, the start icon corresponding to the add instruction is added to the quick start interface. Otherwise when the start icon corresponding to the add instruction exists in the quick start interface, then the start icon will not be added to the quick start interface, so as to avoid two identical start icons present in the quick start interface, which may otherwise result in a waste of system resources.

According to the device for quickly starting a television function provided by this embodiment, when receiving an add instruction which is triggered based on a start icon in the currently displayed startup page, the determining module 40 determines whether the start icon corresponding to the add instruction exists in the quick start interface, and then if the start icon corresponding to the add instruction doesn't exist in the quick start interface, the second adding module 50 will add the start icon corresponding to the start instruction to the quick start interface, so that the user can actively add the start icons of some television functions to the quick start interface, which improves the user experience and meanwhile avoids two identical start icons present in the quick start interface, thereby avoiding the waste of system resources.

Figure 9:
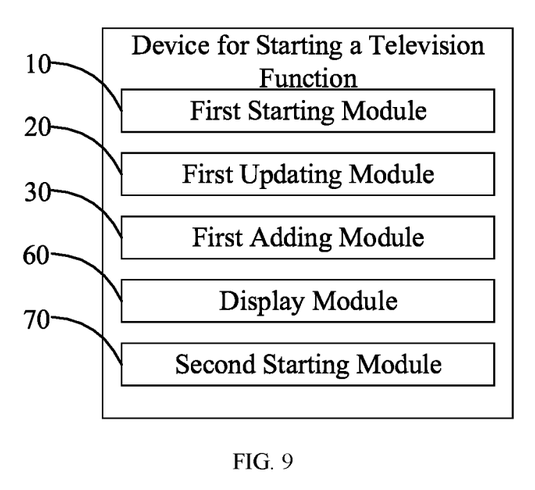
FIG. 9 is an illustrative functional block diagram of a fourth embodiment of the device for quickly starting a television function according to this disclosure.

There is provided a fourth embodiment of the device for quickly starting a television function on the basis of the first embodiment. As illustrated in FIG. 9, the device may further include a display module 60 and a second starting module 70.

The display module 60 is configured to, in response to receiving a display instruction triggered based on the quick start key of the remote controller, display the quick start interface in a display interface of the television.

In this embodiment, the user can trigger a display instruction for the quick start interface through the quick start key of the remote controller; that is, after receiving the display instruction triggered based on the quick start key of the remote controller, the quick start interface will be displayed in the television's display interface, where the quick start interface contains the start icons of all the television functions that have currently been added.

The second starting module 70 is configured to, in response to receiving a start instruction triggered based on a start icon in the quick start interface, start the television function corresponding to the start instruction.

In this embodiment, the user can trigger a start instruction through, e.g., the remote controller. For example, the user can select a start icon in the quick start interface by using the remote controller. After receiving a start instruction triggered based on the start icon in the quick start interface, the television function corresponding to the start instruction can then be started. Thus, the user can start the corresponding television functions through the quick start interface, thereby reducing the operations performed by the user when using the corresponding television functions.

According to the device for quickly starting a television function provided by this embodiment, after receiving a display instruction triggered based on the quick start key of the remote controller, the display module 60 displays the quick start interface in the television's display interface. Then after receiving a start instruction triggered based on a start icon in the quick start interface, the second starting module 70 will start the television function corresponding to the start instruction. Thus, the corresponding television functions can be started through the quick start interface, reducing the operations performed by the user when using the corresponding television functions, resulting in further improved user experience.

Figure 10:
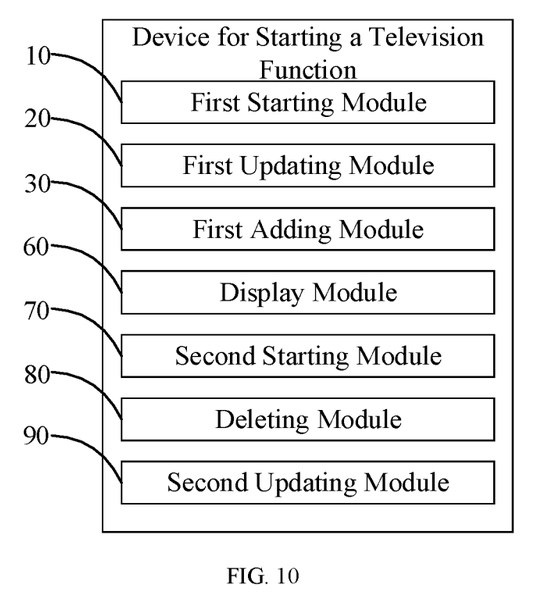
FIG. 10 is an illustrative functional block diagram of a fifth embodiment of the device for quickly starting a television function according to this disclosure.

There is provided a fifth embodiment of the device for quickly starting a television function on the basis of the first embodiment. As illustrated in FIG. 10, the device may further include a deleting module 80 and a second updating module 90.

The deleting module 80 is configured to, in response to receiving a deleting instruction triggered based on a start icon in the quick start interface, delete the start icon corresponding to the deleting instruction from the quick start interface.

In this embodiment, the user can actively delete the start icons of some television functions present in the quick start interface. The deleting instruction for the start icon may be triggered by a remote controller or the like. For example, the remote controller can be used to select a corresponding delete option of the start icon in the quick start interface in order to trigger the deleting instruction for the start icon. Specifically, upon receiving the deleting instruction which is triggered based on the start icon in the quick start interface, the start icon corresponding to this deleting instruction will be deleted from the quick start interface.

The second updating module 90 is configured to update the corresponding number of times of starts of the deleted start icon.

In this embodiment, to facilitate the user to re-add the deleted start icon to the quick start interface after subsequently using this start icon multiple times, the corresponding number of times of starts of the deleted start icon will be updated. Specifically, the number of times of starts may be set to its initial value such as 0; in addition, if the status of the number of times of starts is non-editable, then the status of the number of times of starts can be modified to an editable status.

According to the device for quickly starting a television function provided by this embodiment, after receiving a deleting instruction triggered based on a start icon in the quick start interface, the deleting module 80 deletes the start icon corresponding to the deleting instruction from the quick start interface, and then the second updating module 90 updates the corresponding number of times of starts of the deleted start icon. Thus, the user can delete the start icons in the quick start interface as needed in order to avoid the start icons of the infrequently used television functions residing in the quick start interface for a long time, thereby saving system resources. Meanwhile, updating the number of times of starts can facilitate the user to re-add the deleted start icon to the quick start interface after subsequently repeatedly using the deleted start icon, thereby further improving the user experience.

Furthermore, it is apparent to those having ordinary skill in the art that this disclosure also provides a device for quickly starting a television function, the device including a non-transitory program storage medium and one or more processors. The non-transitory program storage medium stores program code executable by the one or more processors to perform the various methods as described supra.

Furthermore, it will be evident to those having ordinary skill in the art that various units or modules 10, 20, 30, 31, 32, 40, 50, 60, 70, 80, and 90, as illustrated in FIGS. 6-10, can be software modules or software units. In another aspect, it is well-known that various software modules or software units inherently can be stored in the non-transitory program storage medium and executed by the one or more processors.

The foregoing merely portrays some illustrative embodiments according to this disclosure and therefore is not intended to limit the scope of protection of this disclosure. Any equivalent structural changes or flow transformations based on the specification and accompanying drawings of this disclosure and any direct/indirect applications of this disclosure on other related technical fields shall all be compassed within the scope of protection of this disclosure.

What is claimed is:

1. A method for quickly starting a television function, comprising:
   in response to receiving a start instruction triggered based on a start icon in a currently displayed startup page, starting a function of a television corresponding to the start instruction, the startup page containing corresponding start icons of a plurality of television functions;
   updating the number of times of starts of the start icon corresponding to the start instruction; and
   determining whether the television function corresponding to the start instruction exists in a quick start interface when the updated number of times of starts is greater than a preset number of times; and
   adding the start icon corresponding to the start instruction to the quick start interface when the start icon corresponding to the start instruction doesn't exist in the quick start interface, and setting the number of times of starts to a non-editable status.

2. The method as claimed in claim 1, further comprising:
   in response to receiving an add instruction triggered based on a start icon in the currently displayed startup page, determining whether the start icon corresponding to the add instruction exists in the quick start interface; and
   adding the start icon corresponding to the add instruction to the quick start interface when the start icon corresponding to the add instruction doesn't exist in the quick start interface.

3. The method as claimed in claim 1, wherein subsequent to adding the start icon corresponding to the start instruction to the quick start interface corresponding to the quick start key of the remote controller, the method further comprises:
   in response to receiving a display instruction triggered based on the quick start key of the remote controller, displaying the quick start interface in a display interface of the television; and
   in response to receiving a start instruction triggered based on a start icon in the quick start interface, starting a television function corresponding to the start instruction.

4. The method as claimed in claim 3, wherein subsequent to displaying the quick start interface in the display interface of the television, the method further comprises:
   in response to receiving a deleting instruction triggered based on a start icon in the quick start interface, deleting the start icon corresponding to the deleting instruction from the quick start interface; and
   updating the corresponding number of times of starts of the deleted start icon.

5. The method as claimed in claim 2, wherein subsequent to adding the start icon corresponding to the start instruction to the quick start interface corresponding to the quick start key of the remote controller, the method further comprises:
   in response to receiving a display instruction triggered based on the quick start key of the remote controller, displaying the quick start interface in a display interface of the television; and
   in response to receiving a start instruction triggered based on a start icon in the quick start interface, starting a television function corresponding to the start instruction.

6. The method as claimed in claim 5, wherein subsequent to displaying the quick start interface in the display interface of the television, the method further comprises:
   in response to receiving a deleting instruction triggered based on a start icon in the quick start interface, deleting the start icon corresponding to the deleting instruction from the quick start interface; and
   updating the corresponding number of times of starts of the deleted start icon.

7. A device for quickly starting a television function, comprising one or more processors and a non-transitory program storage medium containing program code executable by the one or more processors, the program code comprising:
   a first starting module, configured to, in response to receiving a start instruction triggered based on a start icon in a currently displayed startup page, start a function of a television corresponding to the start instruction, wherein the startup page contains corresponding start icons of plurality of television functions;
   a first updating module, configured to update the number of times of starts of the start icon corresponding to the start instruction; and
   a determining unit, configured to determine whether the television function corresponding to the start instruction exists in a quick start interface when the updated number of times of starts is greater than a preset number of times; and
   an adding unit, configured to add the start icon corresponding to the start instruction to the quick start interface when the start icon corresponding to the start instruction doesn't exist in the quick start interface, and set the number of times of starts to a non-editable status.

8. The device as claimed in claim 7, wherein the program code further comprises:
   a determining module, configured to, in response to receiving an add instruction triggered based on a start icon in the currently displayed startup page, determine whether the start icon corresponding to the add instruction exists in the quick start interface; and
   a second adding module, configured to add the start icon corresponding to the add instruction to the quick start interface when the start icon corresponding to the start add instruction doesn't exist in the quick start interface.

9. The device as claimed in claim 7, wherein the program code further comprises:
   a display module, configured to, in response to receiving a display instruction triggered based on the quick start key of the remote controller, display the quick start interface in a display interface of the television; and
   a second starting module, configured to, in response to receiving a start instruction triggered based on a start icon in the quick start interface, start a television function corresponding to the start instruction.

10. The device as claimed in claim 9, wherein the program code further comprises:

a deleting module, configured to, in response to receiving a deleting instruction triggered based on a start icon in the quick start interface, delete the start icon corresponding to the deleting instruction from the quick start interface; and
a second updating module, configured to update the corresponding number of times of starts of the deleted start icon.

* * * * *